US011530095B2

(12) United States Patent
Walker et al.

(10) Patent No.: US 11,530,095 B2
(45) Date of Patent: Dec. 20, 2022

(54) CHAIN CONVEYOR AND LINK FOR SAME

(71) Applicant: Joy Global Underground Mining LLC, Warrendale, PA (US)

(72) Inventors: Aaron Philip Walker, Evans City, PA (US); Christopher George Stewart, Oil City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 16/933,660

(22) Filed: Jul. 20, 2020

(65) Prior Publication Data

US 2020/0354150 A1 Nov. 12, 2020

Related U.S. Application Data

(63) Continuation of application No. 15/913,810, filed on Mar. 6, 2018, now Pat. No. 10,717,603.
(Continued)

(51) Int. Cl.
*B65G 19/20* (2006.01)
*B65G 17/06* (2006.01)
(Continued)

(52) U.S. Cl.
CPC ............. *B65G 19/20* (2013.01); *B65G 17/06* (2013.01); *B65G 17/26* (2013.01); *B65G 17/40* (2013.01);
(Continued)

(58) Field of Classification Search
CPC ........ B65G 17/06; B65G 17/26; B65G 17/40; B65G 17/44; B65G 19/08; B65G 19/18;
(Continued)

(56) References Cited

U.S. PATENT DOCUMENTS

| 231,186 A | 8/1880 | Neacy |
| 572,991 A | 12/1896 | Howard |

(Continued)

FOREIGN PATENT DOCUMENTS

| CN | 1044627 A | 8/1990 |
| CN | 2211981 Y | 11/1995 |

(Continued)

OTHER PUBLICATIONS

Chinese Patent Office First Office Action for Application No. 201880026700.4 dated Dec. 14, 2020 (10 pages including English summary).
(Continued)

*Primary Examiner* — Douglas A Hess
(74) *Attorney, Agent, or Firm* — Michael Best & Friedrich LLP

(57) ABSTRACT

A link for a conveyor chain includes a first portion and a second portion laterally spaced apart from the first portion. The first portion includes a first sprocket-engaging pin, and the second portion includes a second sprocket-engaging pin. The first sprocket-engaging pin and the second sprocket-engaging pin protrude laterally away from one another. The first sprocket-engaging pin and the second sprocket-engaging pin may each have an oblong cross-section. At least one retainer can secure a connecting pin against movement relative to at least one of the first portion and the second portion, and each retainer can be positioned substantially within one of the first portion and the second portion.

26 Claims, 17 Drawing Sheets

Related U.S. Application Data

(60) Provisional application No. 62/467,761, filed on Mar. 6, 2017, provisional application No. 62/467,766, filed on Mar. 6, 2017, provisional application No. 62/467,767, filed on Mar. 6, 2017, provisional application No. 62/467,769, filed on Mar. 6, 2017, provisional application No. 62/467,770, filed on Mar. 6, 2017, provisional application No. 62/467,773, filed on Mar. 6, 2017.

(51) Int. Cl.
| | |
|---|---|
| E21F 13/06 | (2006.01) |
| B65G 17/40 | (2006.01) |
| B65G 17/44 | (2006.01) |
| B65G 19/08 | (2006.01) |
| B65G 19/18 | (2006.01) |
| B65G 17/26 | (2006.01) |
| B65G 19/24 | (2006.01) |
| B65G 21/12 | (2006.01) |
| B65G 21/20 | (2006.01) |
| E21C 31/06 | (2006.01) |
| B65G 23/08 | (2006.01) |
| B65G 23/22 | (2006.01) |
| E21C 25/34 | (2006.01) |
| B65G 23/06 | (2006.01) |
| E21C 35/20 | (2006.01) |
| B65G 17/38 | (2006.01) |
| B65G 19/22 | (2006.01) |
| B65G 19/26 | (2006.01) |
| E21C 31/12 | (2006.01) |

(52) U.S. Cl.
CPC ............ *B65G 17/44* (2013.01); *B65G 19/08* (2013.01); *B65G 19/18* (2013.01); *B65G 19/205* (2013.01); *B65G 19/24* (2013.01); *B65G 21/12* (2013.01); *B65G 21/2045* (2013.01); *B65G 23/06* (2013.01); *B65G 23/08* (2013.01); *B65G 23/22* (2013.01); *E21C 25/34* (2013.01); *E21C 31/06* (2013.01); *E21C 35/20* (2013.01); *E21F 13/066* (2013.01); *B65G 17/38* (2013.01); *B65G 19/22* (2013.01); *B65G 19/26* (2013.01); *B65G 2201/045* (2013.01); *B65G 2207/48* (2013.01); *B65G 2812/0295* (2013.01); *B65G 2812/0297* (2013.01); *E21C 31/12* (2013.01)

(58) Field of Classification Search
CPC ........ B65G 19/20; B65G 19/24; B65G 21/12; B65G 23/06; B65G 23/08; B65G 23/22; E21C 25/34; E21C 31/06; E21C 35/20
USPC ................ 198/728, 730, 850, 851, 852, 853
See application file for complete search history.

(56) References Cited

U.S. PATENT DOCUMENTS

| | | |
|---|---|---|
| 708,924 A | 9/1902 | Scott et al. |
| 1,008,890 A | 11/1911 | Demarest |
| 1,020,863 A | 3/1912 | Weichseldorfer |
| 1,153,375 A | 9/1915 | Elliott |
| 1,427,229 A | 8/1922 | Robbins et al. |
| 1,699,334 A | 1/1929 | Petersen |
| 1,869,050 A | 7/1932 | Coppage |
| 2,222,025 A | 11/1940 | Fischer |
| 2,386,619 A | 10/1945 | Long et al. |
| 2,450,501 A | 10/1948 | Clarkson |
| 2,674,365 A | 4/1954 | Russell |
| 2,754,957 A | 7/1956 | Dodson |
| 2,761,548 A | 9/1956 | Long |
| 2,784,836 A | 3/1957 | Tourneau |
| 3,005,358 A | 10/1961 | Gandrud |
| 3,089,579 A | 5/1963 | Beck |
| 3,103,275 A | 9/1963 | Rollins |
| 3,119,276 A | 1/1964 | Pearson |
| 3,145,576 A | 8/1964 | Proctor |
| 3,225,897 A | 12/1965 | Rollins |
| 3,324,990 A | 6/1967 | Karlovsky, Jr. |
| 3,452,228 A | 6/1969 | Woolley |
| 3,472,563 A | 10/1969 | Iregens |
| 3,540,566 A | 11/1970 | Perry et al. |
| 3,602,364 A | 8/1971 | Maglio et al. |
| 3,908,477 A | 9/1975 | Teske et al. |
| 3,961,702 A | 6/1976 | Blok |
| 4,037,713 A | 7/1977 | Soliman et al. |
| 4,175,797 A | 11/1979 | Krekeler |
| 4,202,219 A | 5/1980 | Weis |
| 4,218,932 A | 8/1980 | McComber |
| 4,238,028 A | 12/1980 | Lake |
| 4,461,372 A | 7/1984 | Bekkala et al. |
| 4,585,117 A | 4/1986 | Hahn |
| 4,766,995 A | 8/1988 | Sterwerf, Jr. |
| 4,844,314 A | 4/1989 | Wilson, III |
| 4,844,316 A | 7/1989 | Keeny |
| 4,899,868 A | 2/1990 | Johnson |
| 4,917,658 A | 4/1990 | Sugimoto et al. |
| 4,964,344 A | 10/1990 | Robinson |
| 5,000,310 A | 3/1991 | Edmondson |
| 5,056,651 A | 10/1991 | Nagamatsu |
| 5,088,594 A | 2/1992 | Edmondson |
| 5,096,048 A | 3/1992 | Lachner et al. |
| 5,156,256 A | 10/1992 | David |
| 5,165,766 A | 11/1992 | Thomas |
| 5,177,949 A | 1/1993 | Stadele et al. |
| 5,186,526 A | 2/1993 | Pennington |
| 5,213,199 A | 5/1993 | Braun et al. |
| 5,226,526 A | 7/1993 | O'Brien |
| 5,249,664 A | 10/1993 | Steinkuhl |
| 5,305,872 A | 4/1994 | Hutton |
| 5,628,393 A | 5/1997 | Steeber |
| 5,669,680 A | 9/1997 | Bertoni |
| 5,762,424 A | 6/1998 | Harris et al. |
| 6,640,534 B1 | 11/2003 | Harnaes et al. |
| 6,662,932 B1 | 12/2003 | O'Neill |
| 7,036,657 B1 | 5/2006 | Robinson |
| 7,118,648 B2 | 10/2006 | Dever et al. |
| 7,422,256 B2 | 9/2008 | Mueller |
| 7,438,180 B1 | 10/2008 | Taylor et al. |
| 7,442,139 B2 | 10/2008 | Kubo et al. |
| 7,540,374 B2 | 6/2009 | Rathbun et al. |
| 7,997,402 B2 | 8/2011 | Merten et al. |
| 8,016,102 B2 * | 9/2011 | Morris ................ F16G 13/10 198/852 |
| 8,038,558 B2 | 10/2011 | Klabisch et al. |
| 8,141,696 B2 | 3/2012 | O'Neill |
| 8,177,049 B2 | 5/2012 | O'Neill |
| 8,360,912 B2 | 1/2013 | Klabisch et al. |
| 8,448,781 B2 | 5/2013 | Morris |
| 8,453,826 B2 | 6/2013 | Morris |
| 8,672,110 B2 | 3/2014 | Jaeger |
| 8,936,146 B2 | 1/2015 | Morris |
| 8,950,571 B2 | 2/2015 | O'Neill |
| 8,978,877 B2 | 3/2015 | O'Neill |
| 9,227,787 B2 | 1/2016 | Morris et al. |
| 9,284,124 B2 | 3/2016 | Klingbeil |
| 9,415,939 B2 | 8/2016 | Arnold et al. |
| 9,434,428 B2 | 9/2016 | Hakes et al. |
| 9,487,358 B2 | 11/2016 | Morris et al. |
| 10,106,325 B2 | 10/2018 | Walker et al. |
| 10,150,617 B2 | 12/2018 | O'Neill |
| 10,392,193 B2 * | 8/2019 | Walker ................ B65G 17/44 |
| 10,414,594 B2 | 9/2019 | Walker et al. |
| 10,442,627 B2 * | 10/2019 | Walker ................ B65G 17/44 |
| 10,604,347 B2 * | 3/2020 | Walker ................ B65G 19/205 |
| 10,875,717 B2 * | 12/2020 | Morris ................ B65G 23/06 |
| 10,974,905 B2 * | 4/2021 | Walker ................ E21C 35/20 |
| 10,981,728 B2 * | 4/2021 | Walker ................ B65G 21/12 |
| 2002/0050442 A1 | 5/2002 | Malitzki |

(56) References Cited

U.S. PATENT DOCUMENTS

| | | |
|---|---|---|
| 2002/0129732 A1 | 9/2002 | Marshall |
| 2004/0140182 A1 | 7/2004 | Morris |
| 2005/0176539 A1 | 8/2005 | Hirschmann |
| 2005/0027459 A1 | 12/2005 | Kwiat |
| 2005/0274590 A1 | 12/2005 | Kwiat |
| 2006/0058144 A1 | 3/2006 | Lacerda |
| 2006/0172841 A1 | 8/2006 | Nunez et al. |
| 2007/0107412 A1 | 5/2007 | Humcke et al. |
| 2008/0011588 A1 | 1/2008 | Frost et al. |
| 2008/0284245 A1 | 11/2008 | Livesay et al. |
| 2009/0218199 A1 | 9/2009 | Russell |
| 2009/0250318 A1 | 10/2009 | O'Neill |
| 2009/0277757 A1 | 11/2009 | Boudreau |
| 2009/0318239 A1 | 12/2009 | Kampf |
| 2010/0276254 A1 | 11/2010 | O'Neill |
| 2011/0067793 A1 | 3/2011 | Nukushina |
| 2011/0067980 A1 | 3/2011 | Martin |
| 2011/0088367 A1 | 4/2011 | Powell et al. |
| 2011/0315521 A1 | 12/2011 | O'Neill |
| 2012/0048684 A1 | 3/2012 | Morris |
| 2013/0203539 A1 | 8/2013 | Kirchner et al. |
| 2013/0227833 A1 | 9/2013 | Rizzo |
| 2013/0284569 A1 | 10/2013 | Studer |
| 2013/0334015 A1 | 12/2013 | Lasecki |
| 2014/0027247 A1 | 1/2014 | Cox et al. |
| 2014/0116850 A1 | 5/2014 | Musick et al. |
| 2014/0131177 A1 | 5/2014 | Delair et al. |
| 2014/0239699 A1 | 8/2014 | O'Neill |
| 2015/0008101 A1 | 1/2015 | Miglava |
| 2015/0101912 A1 | 4/2015 | Morris et al. |
| 2015/0191313 A1 | 7/2015 | Arnold et al. |
| 2015/0266527 A1 | 9/2015 | Akinlua et al. |
| 2015/0353152 A1 | 12/2015 | Hakes et al. |
| 2016/0159417 A1 | 6/2016 | Zimmer et al. |
| 2016/0200520 A1 | 7/2016 | Menke et al. |
| 2017/0137226 A1 | 5/2017 | Morris et al. |

FOREIGN PATENT DOCUMENTS

| | | |
|---|---|---|
| CN | 1517280 A | 8/2004 |
| CN | 201087012 Y | 7/2008 |
| CN | 101602433 A | 12/2009 |
| CN | 101875433 A | 11/2010 |
| CN | 102227361 A | 10/2011 |
| CN | 102639391 A | 8/2012 |
| CN | 103419853 A | 12/2013 |
| CN | 103608250 A | 2/2014 |
| CN | 104295668 A | 1/2015 |
| CN | 105083860 A | 11/2015 |
| CN | 204916962 A | 12/2015 |
| CN | 105221664 A | 1/2016 |
| CN | 105386759 A | 3/2016 |
| CN | 106170450 A | 11/2016 |
| DE | 3151059 A1 | 7/1983 |
| DE | 19633298 A1 | 2/1998 |
| DE | 20300239 U1 | 3/2003 |
| EP | 1197671 A1 | 4/2002 |
| EP | 2147875 A2 | 1/2010 |
| EP | 2221495 A1 | 8/2010 |
| EP | 2436944 A2 | 4/2012 |
| GB | 205440 A | 10/1923 |
| GB | 658623 A | 10/1951 |
| GB | 671424 A | 5/1952 |
| GB | 1469553 A | 4/1977 |
| GB | 2458768 A | 10/2009 |
| JP | 2002120921 A | 4/2002 |
| JP | 05576263 B2 | 8/2014 |
| RU | 2064393 C1 | 7/1996 |
| RU | 2091286 C1 | 9/1997 |
| SU | 713780 A1 | 2/1980 |
| SU | 963922 A2 | 10/1982 |
| WO | 9008716 A1 | 8/1990 |
| WO | 03013987 A2 | 2/2003 |
| WO | 2012054775 A1 | 4/2012 |
| WO | 2014076164 A1 | 5/2014 |
| WO | 2014197383 A2 | 12/2014 |
| WO | 2016159417 A1 | 10/2016 |

OTHER PUBLICATIONS

Bureau of Mines United States Department of the Interior, "Noise Study of Longwall Mining Systems", Jan. 1986, Contract JO188072, Wyole Laboratories, cover page, p. 3, pp. 131-137 (9 pages).

Leikin A. E., Rodin B.1., "Adhesive Materials", Material Sciences. M., High School, 1971, p. 405, http://www.nglib.ru/book_view.jsp?idn=0164 70&page=405&format=free.

International Search Report with Written Opinion for Application No. PCT/US18/21226 dated May 24, 2018 (19 pages).

Russian Patent Office Action and Search Report for Application No. 2019131363 dated Apr. 2, 2021 (14 pages).

United Kingdom Intellectual Property Office Examination Report for Application No. 1913496.4 dated Sep. 16, 2021 (1 page).

Chinese Patent Office Second Office Action and Search Report for Application No. 201880026700.4 dated Jul. 21, 2021 (11 pages including brief English summary).

Russian Patent Office Action and Search Report for Application No. 2019131363/11 (061597) dated Sep. 28, 2021 (8 pages, translation included).

United Kingdom Intellectual Property Office Examination Report for Application No. 1913496.4 dated Dec. 8, 2021 (5 pages).

United Kingdom Intellectual Property Office Examination Report for Application No. 1913492.3 dated Dec. 8, 2021 (3 pages).

United Kingdom Intellectual Property Office Combined Search and Examination Report for Application No. 1913496.4 dated May 17, 2022 (3 pages).

United Kingdom Intellectual Property Office Combined Search and Examination Report for Application No. 2208840.5 dated Jun. 24, 2022 (5 pages).

United Kingdom Intellectual Property Office Combined Search and Examination Report for Application No. 2208839.7 dated Jun. 22, 2022 (5 pages).

United Kingdom Intellectual Property Office Search Report for Application No. 2208841.3 dated Jun. 29, 2022 (4 pages).

United Kingdom Intellectual Property Office Combined Search and Examination Report for Application No. 2208838.9 dated Jun. 30, 2022 (5 pages).

United Kingdom Intellectual Property Office Examination Report for Application No. 2208838.9 dated Sep. 6, 2022 (2 pages).

\* cited by examiner

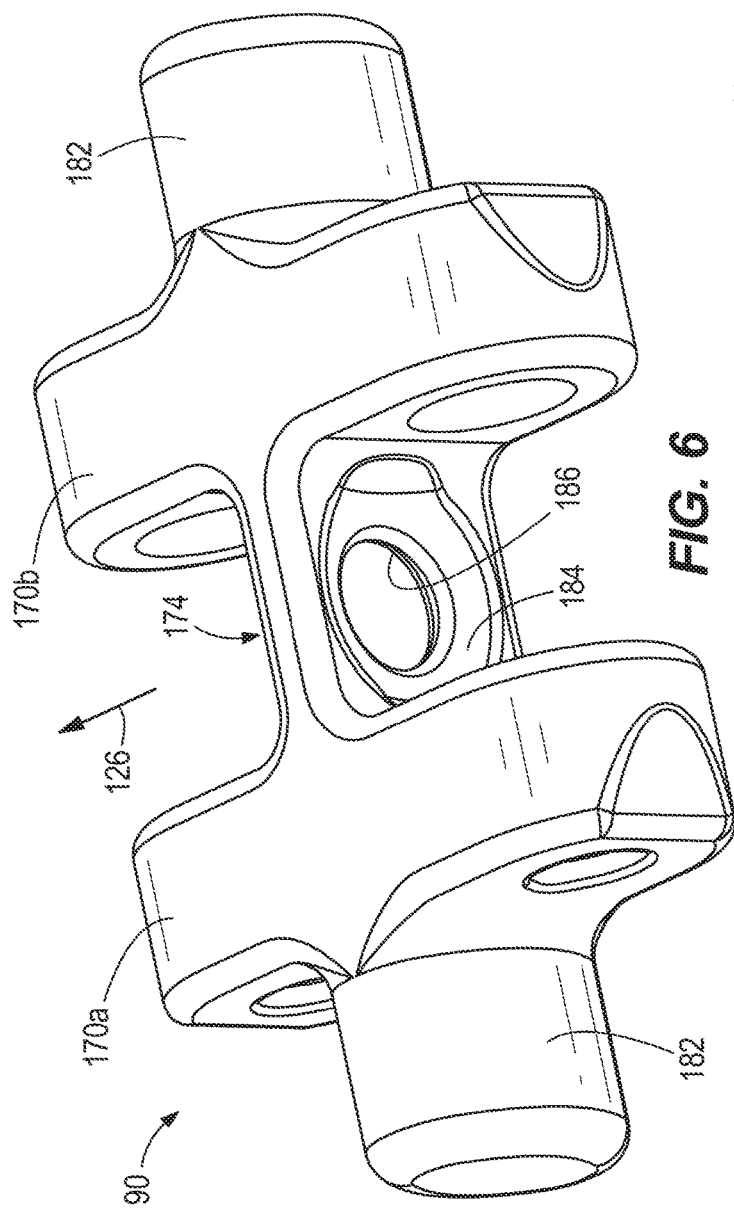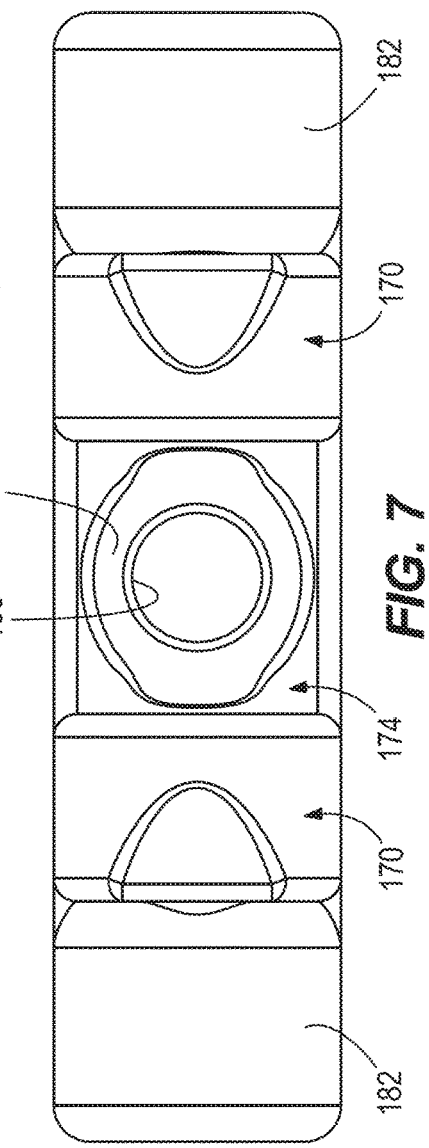

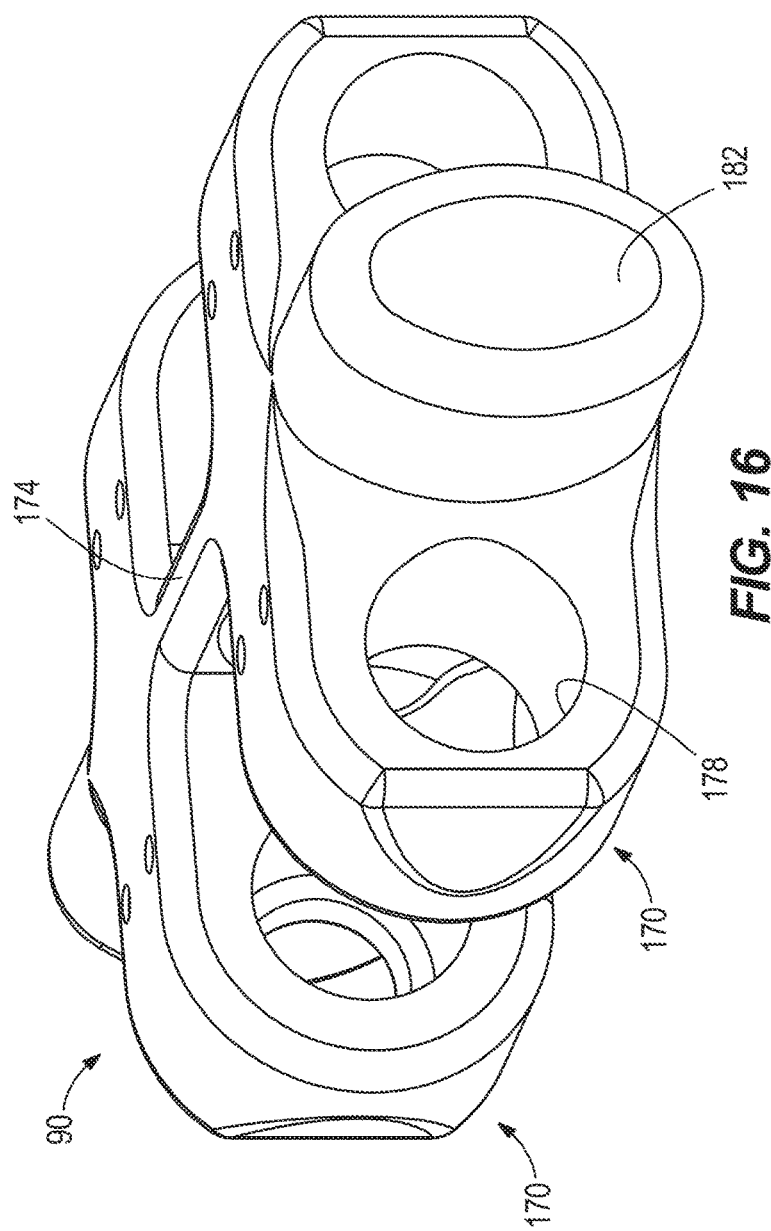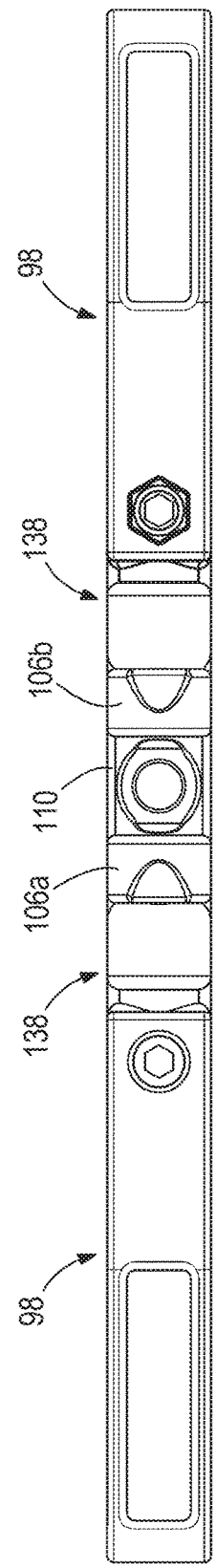

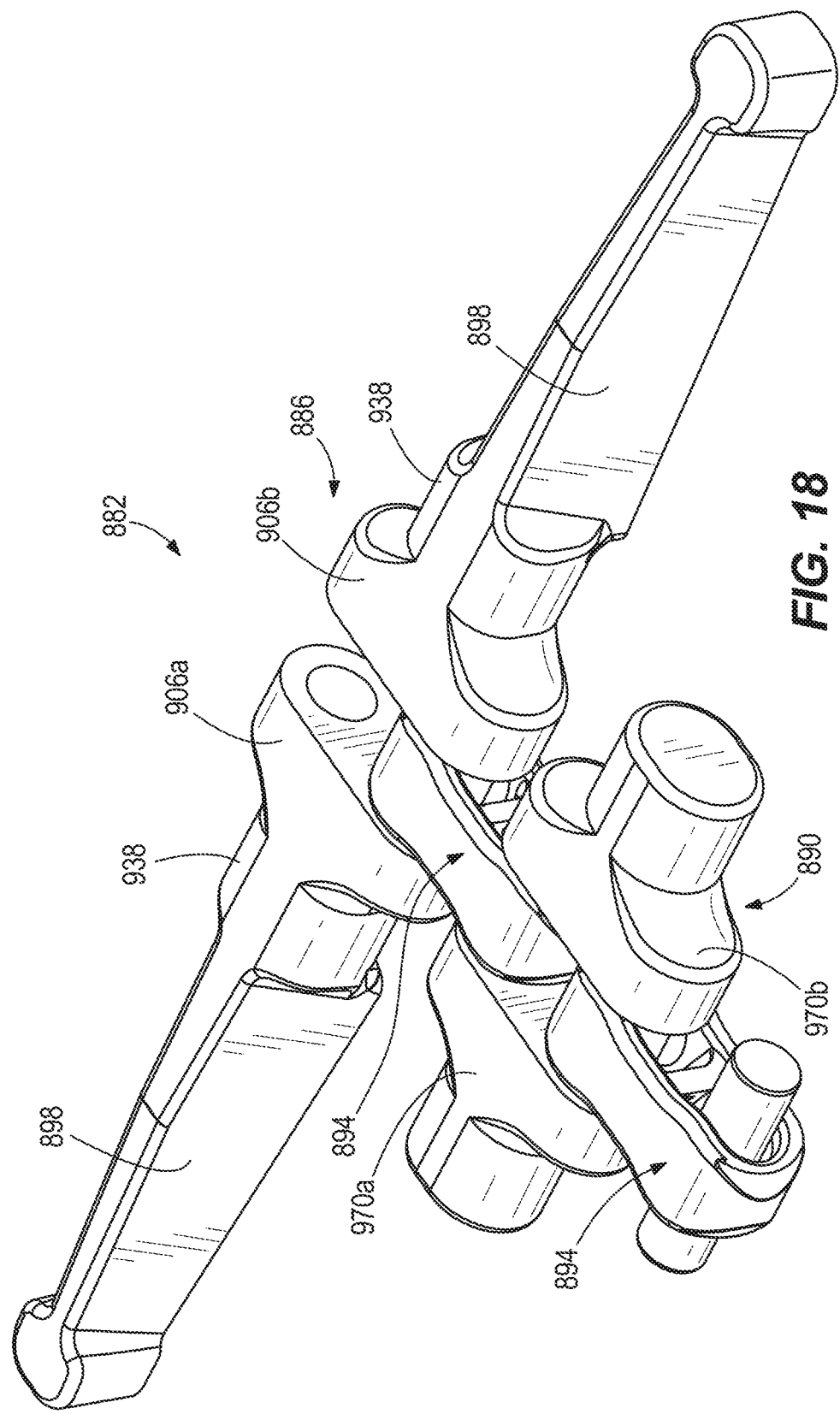

CHAIN CONVEYOR AND LINK FOR SAME

CROSS-REFERENCE TO RELATED APPLICATIONS

This application is a continuation of co-pending U.S. patent application Ser. No. 15/913,810, Mar. 6, 2018, which claims the benefit of U.S. Provisional Patent Application No. 62/467,761, filed Mar. 6, 2017; U.S. Provisional Patent Application No. 62/467,766, filed Mar. 6, 2017; U.S. Provisional Patent Application No. 62/467,767, filed Mar. 6, 2017; U.S. Provisional Patent Application No. 62/467,769, filed Mar. 6, 2017; U.S. Provisional Patent Application No. 62/467,770, filed Mar. 6, 2017; and U.S. Provisional Patent Application No. 62/467,773, filed Mar. 6, 2017. The entire contents of each of these documents are incorporated by reference herein.

BACKGROUND

The present disclosure relates to material conveyors, and particularly to chain and flight conveyors.

SUMMARY

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets.

In one independent aspect, a link for a chain conveyor includes a first portion and a second portion. The second portion is oriented parallel to and laterally spaced apart from the first portion. The first portion includes a first sprocket-engaging pin, and the second portion includes a second sprocket-engaging pin. The first sprocket-engaging pin and the second sprocket-engaging pin protrude laterally away from one another. The first sprocket-engaging pin and the second sprocket-engaging pin are aligned with one another along an axis that is transverse with respect to a direction of travel. The first sprocket-engaging pin and the second sprocket-engaging pin each have an oblong cross-section.

In another independent aspect, conveyor chain includes a first link, a second link, a connecting pin for coupling the first link and the second link, and at least one retainer. The first link includes a first portion and a second portion, and the second portion is oriented parallel to and laterally spaced apart from the first portion. The first portion includes a first sprocket-engaging pin, and the second portion includes a second sprocket-engaging pin. The first sprocket-engaging pin and the second sprocket-engaging pin protrude laterally away from one another. The connecting pin extends between the first portion and the second portion of the first link. The at least one retainer secures the connecting pin against movement relative to at least one of the first portion and the second portion. Each retainer is positioned substantially within one of the first portion and the second portion.

In yet another independent aspect, a link for a chain conveyor includes a first portion, a second portion, and an intermediate portion. The first portion includes a first sprocket-engaging pin. The second portion is oriented parallel to and laterally spaced apart from the first portion, and the second portion includes a second sprocket-engaging pin. The first sprocket-engaging pin and the second sprocket-engaging pin are aligned with one another along an axis that is transverse to a direction of travel of the link. The first sprocket-engaging pin and the second sprocket-engaging pin protrude in a direction laterally away from a centerline axis. The intermediate portion extends between the first portion and the second portion and is integrally formed with the first portion and the second portion. The intermediate portion is laterally aligned with the first sprocket-engaging pin and the second sprocket-engaging pin.

Other aspects will become apparent by consideration of the detailed description and accompanying drawings.

BRIEF DESCRIPTION OF THE DRAWINGS

FIG. 6 is a perspective view of a connecting link.
FIG. 7 is an elevation view of the connecting link of FIG. 6.
FIG. 16 is another perspective view of the connecting link of FIG. 6.
FIG. 17 is an elevation view of the chain conveyor unit of FIG. 4.
FIG. 18 is a perspective view of a chain conveyor unit according to another embodiment.

Figure 1:
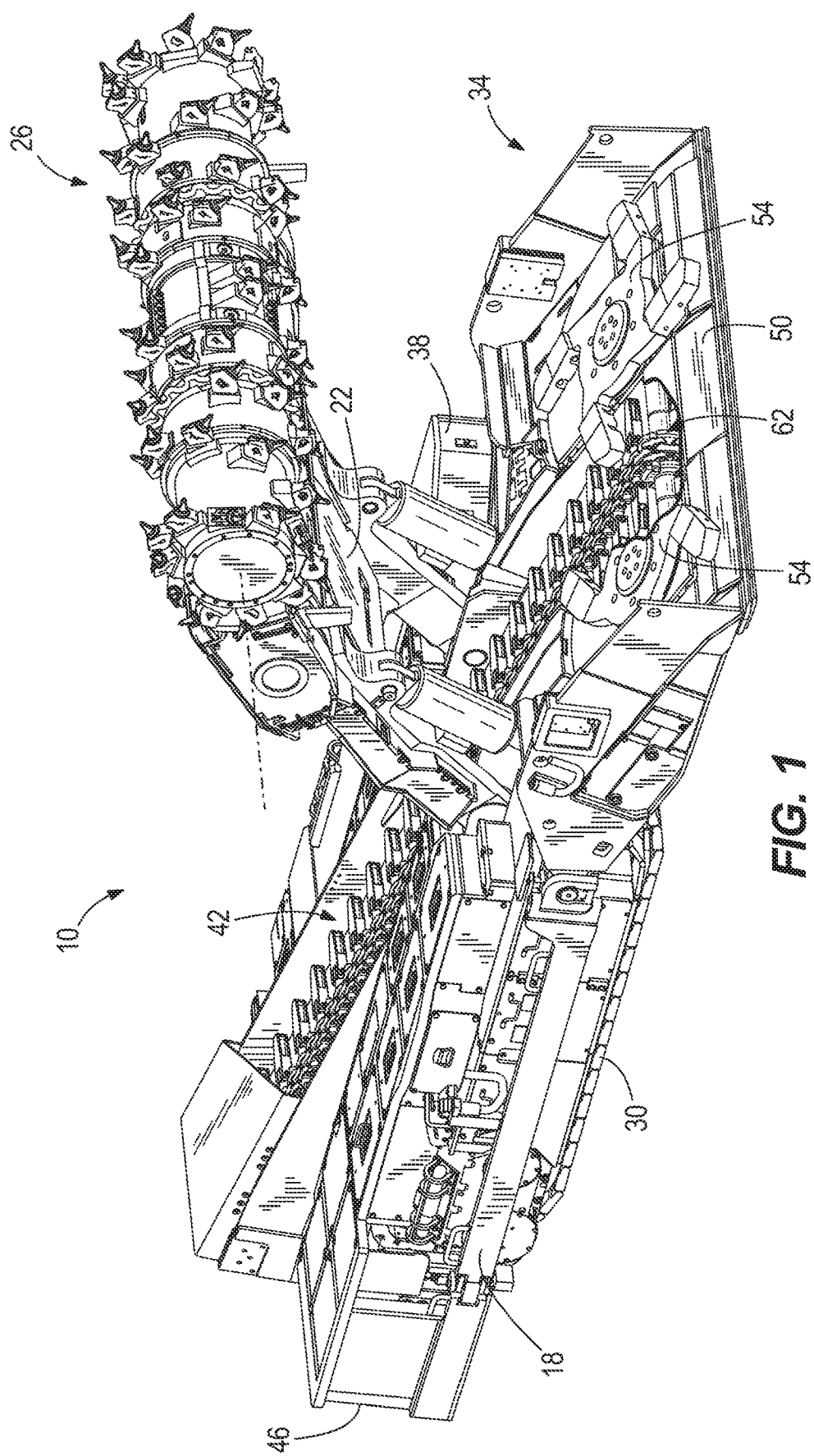
FIG. 1 is a perspective view of a mining machine with a portion of a gathering head cutaway.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect. Also, electronic communications and notifications may be performed using any known means including direct connections, wireless connections, etc.

DETAILED DESCRIPTION

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

Figure 2:
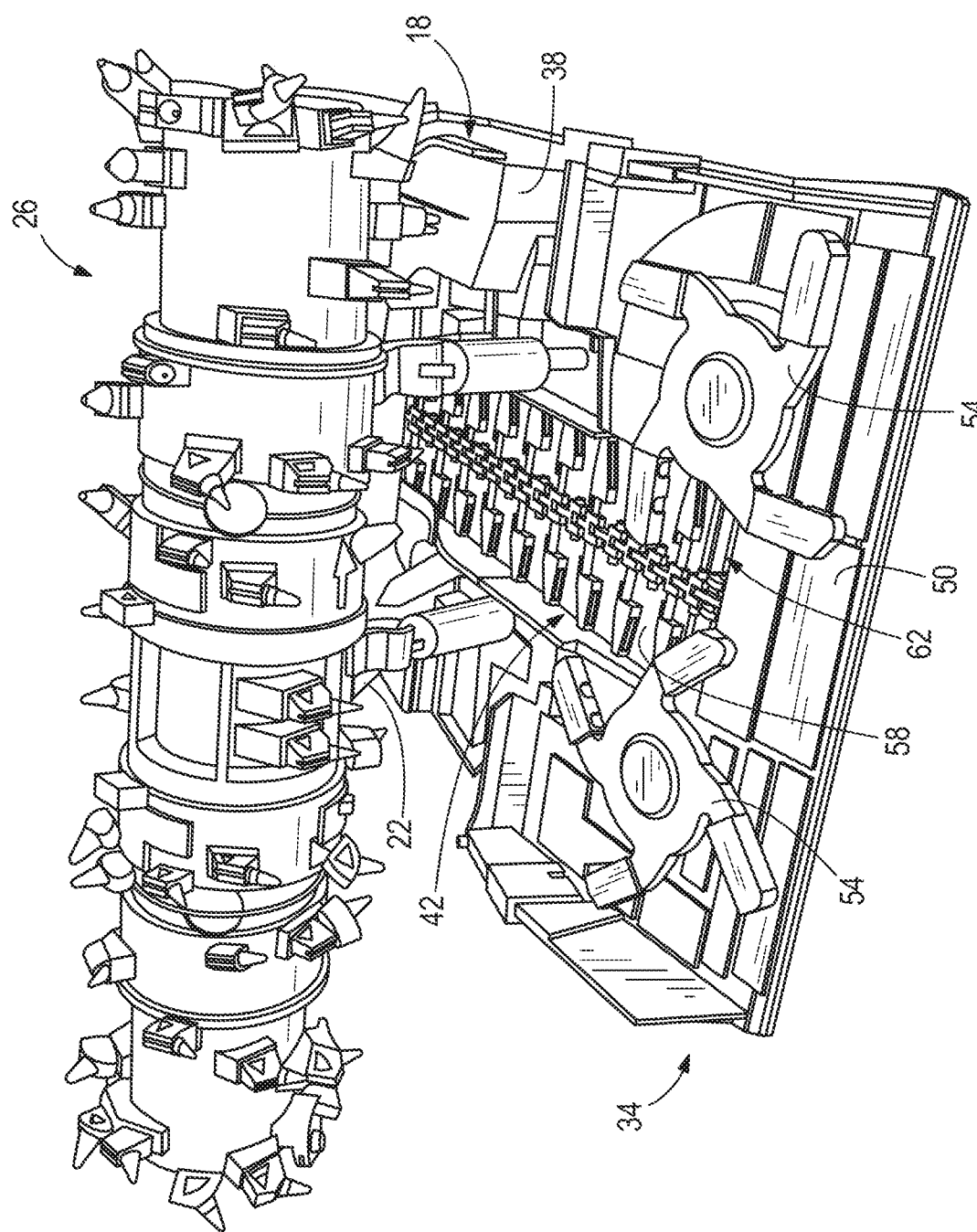
FIG. 2 is a perspective view of a forward end of the mining machine of FIG. 1.

As shown in FIGS. 1 and 2, a collecting mechanism or gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a pair of rotating arms 54 that engage and direct dislodged material onto the conveyor 42. The conveyor 42 transports the cut material from the forward end 38 toward the rear end 46 (FIG. 1) of the chassis 18, from the area below the cutter head 26 to another conveyor or a haulage machine (not shown) positioned proximate the rear end 46 of the chassis 18.

Figure 3:
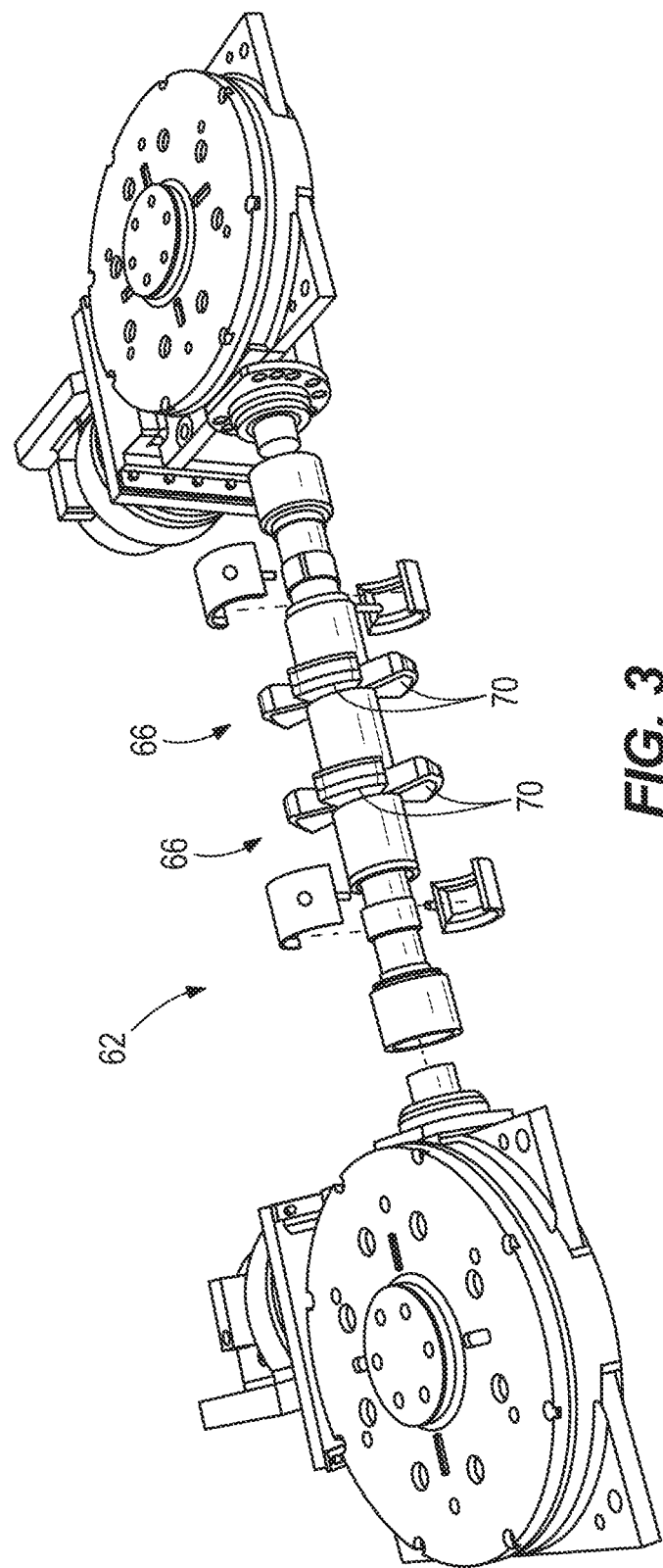
FIG. 3 is an exploded view of a conveyor drive assembly.

As shown in FIG. 2, the conveyor 42 is a chain conveyor formed by chain link connected sequentially in a continuous loop. The conveyor 42 drives cut material along a chain pan or deck 58. The conveyor 42 is driven by a drive assembly including a shaft 62 positioned adjacent the gathering head 34 of the chassis 18. As shown in FIG. 3, the shaft 62 is oriented laterally relative to the chassis 18 (FIG. 2) and is driven (e.g., by one or more motors) to rotate relative to the chassis 18. A pair of sprockets 66 engage and move the conveyor 42. In the illustrated embodiment, each sprocket 66 includes four teeth or lobes 70 spaced apart about the shaft 62, and recesses between the lobes 70 receive and drive the conveyor 42.

Figure 4:
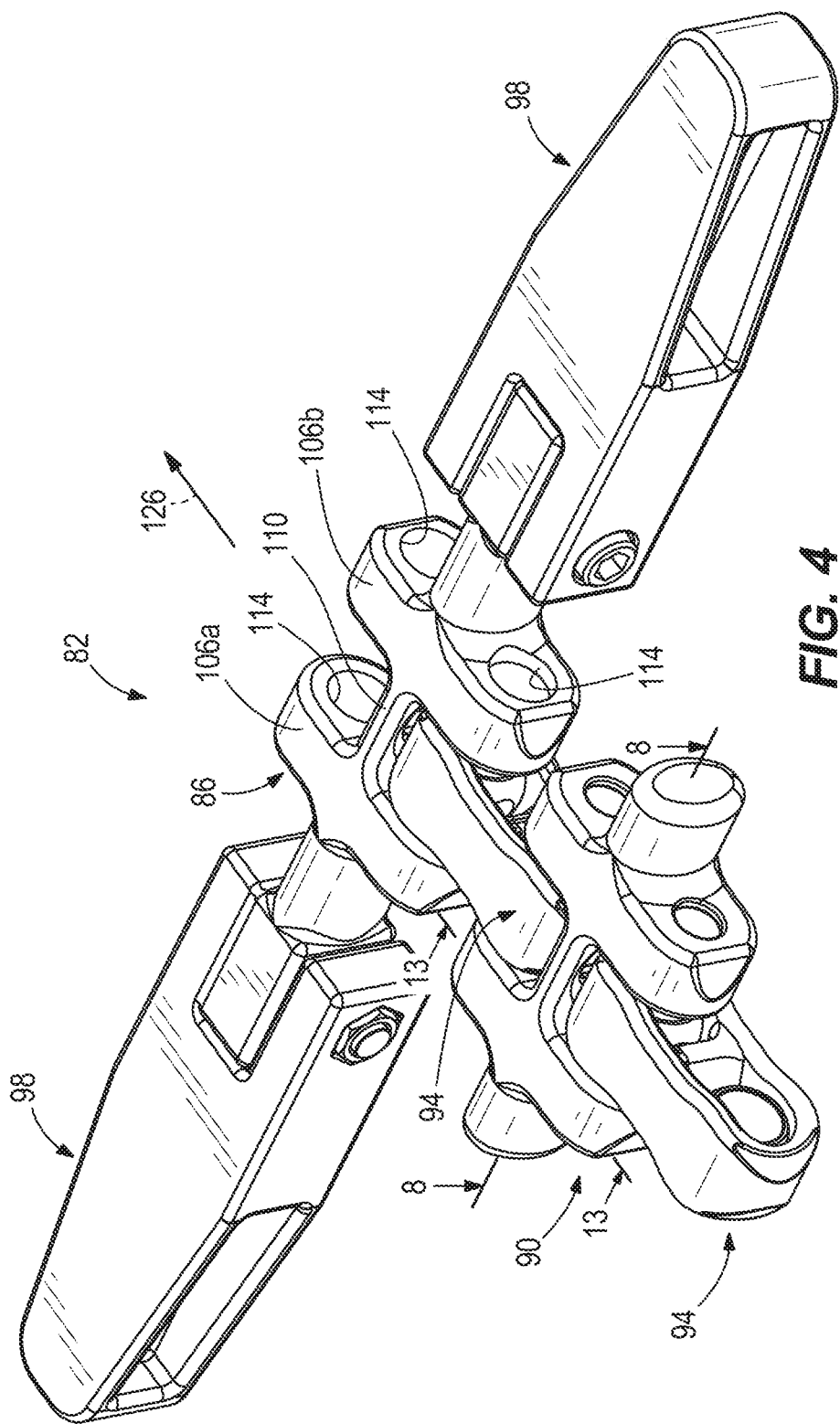
FIG. 4 is a perspective view of a chain conveyor unit.
Figure 5:
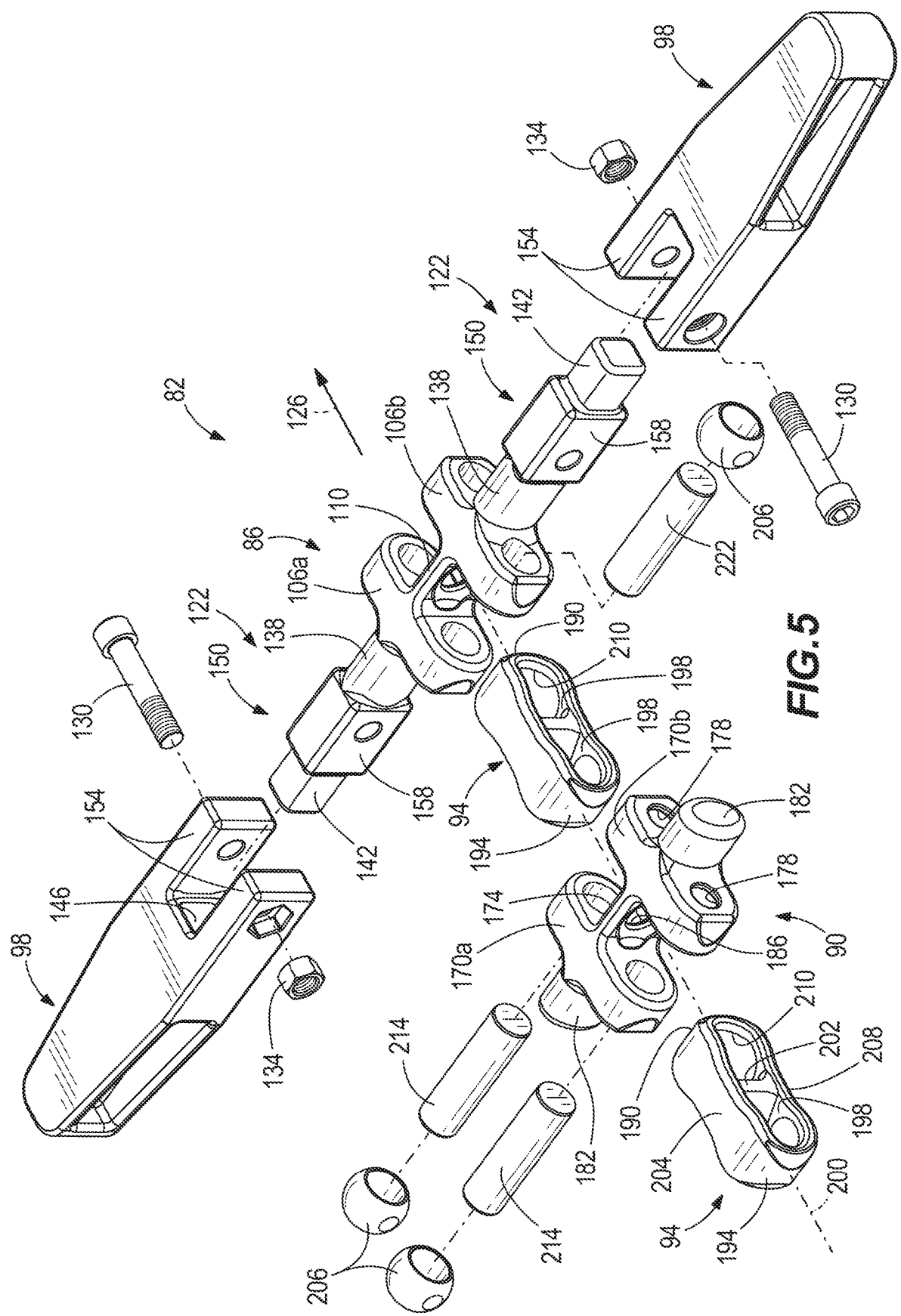
FIG. 5 is an exploded view of the chain conveyor unit of FIG. 4.

FIGS. 4 and 5 show a unit of the chain 82 that forms the conveyor 42. In the illustrated embodiment, the chain 82 includes a first link or flight link 86, a second link or connecting link 90, a coupler link or swivel link 94 coupling the flight link 86 to the connecting link 90, and flights or flight bars 98 positioned laterally outward from the flight link 86. Another swivel link 94 may couple the connecting link 90 to another flight link (not shown), and the conveyor chain 82 may therefore include a sequence of alternating flight links and connecting links, each joined to one another by swivel links. In other embodiments, the chain 82 may include a different sequence of links—for example, multiple connecting links may be positioned between one flight link and the subsequent flight link. Various permutations of the link sequence are possible.

In the illustrated embodiment, the flight link 86 includes a pair of lugs or side portions 106 (a first side portion 106a and a second side portion 106b) and a bridge 110 extending between inner surfaces of the side portions 106. Each side portion 106 includes a pair of apertures 114 extending through the inner surface and an outer surface of each side portion 106.

As best shown in FIG. 5, the flight link 86 further includes a pair of flight pins 122, and each flight pin 122 extends outwardly from the outer surface of one of the side portions 106. In the illustrated embodiment, the flight pins 122 are aligned with one another (i.e., along a common axis), and each of the flight pins 122 is positioned between chain pins 222 (described in further detail below). Stated another way, the flight pins 122 extend laterally or transversely relative to a direction of travel 126 of the conveyor 42. Each of the flight pins 122 is positioned between the apertures 114 of the associated side portion 106. In the illustrated embodiment, each flight bar 98 is removably coupled to one of the flight pins 122 (e.g., by a threaded bolt 130 and nut 134). A sprocket-engaging portion or drive portion 138 of each flight pin 122 is positioned between the side portion 106 and the associated flight bar 98. In the illustrated embodiment, an end portion 142 of each flight pin 122 is positioned within an opening 146 of one of the flight bars 98.

As shown in FIG. 5, each connecting link 90 includes a pair of lugs or side portions 170 (a first side portion 170a and a second side portion 170b) and a bridge 174 extending between inner surfaces of the side portions 170. Each side portion 170 includes a pair of apertures 178 extending through the inner surface and an outer surface of each side portion 170. In addition, a drive pin 182 extends outwardly from an outer surface of each side portion 170. Stated another way, each drive pin 182 extends laterally or transversely relative to the direction of travel 126 of the chain 82. Each drive pin 182 is positioned between the apertures 178 of the associated side portion 170. The sprockets 66 (FIG. 3) engage the drive pins 182 and the drive portions 138 of the flight pins 122 to drive the chain 82. In the illustrated embodiment, the bridge 174 of the connecting link includes an opening 186.

Figure 8:
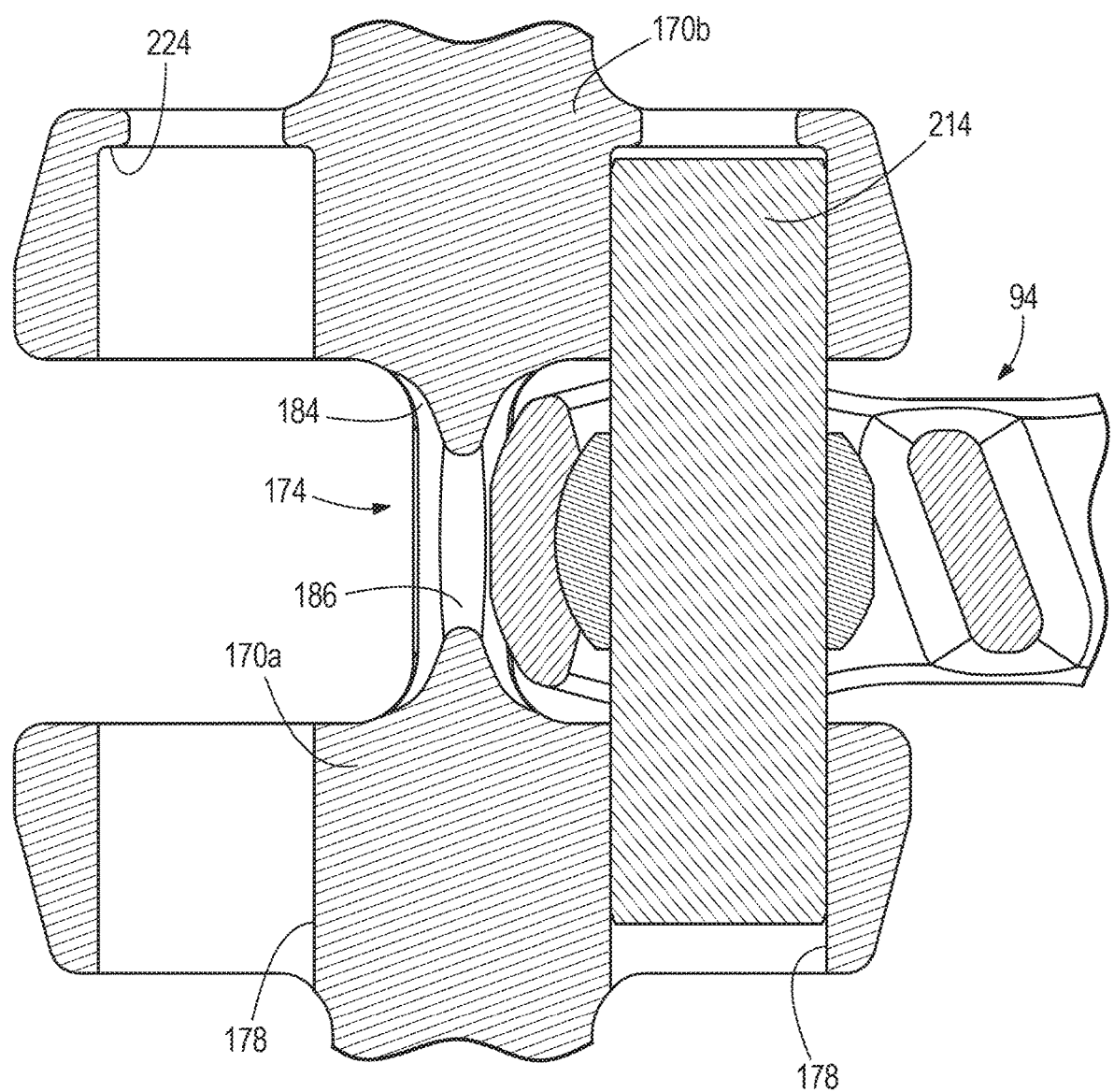
FIG. 8 is a section view of the connecting link viewed along section 8-8 as shown in FIG. 5.
Figure 9:
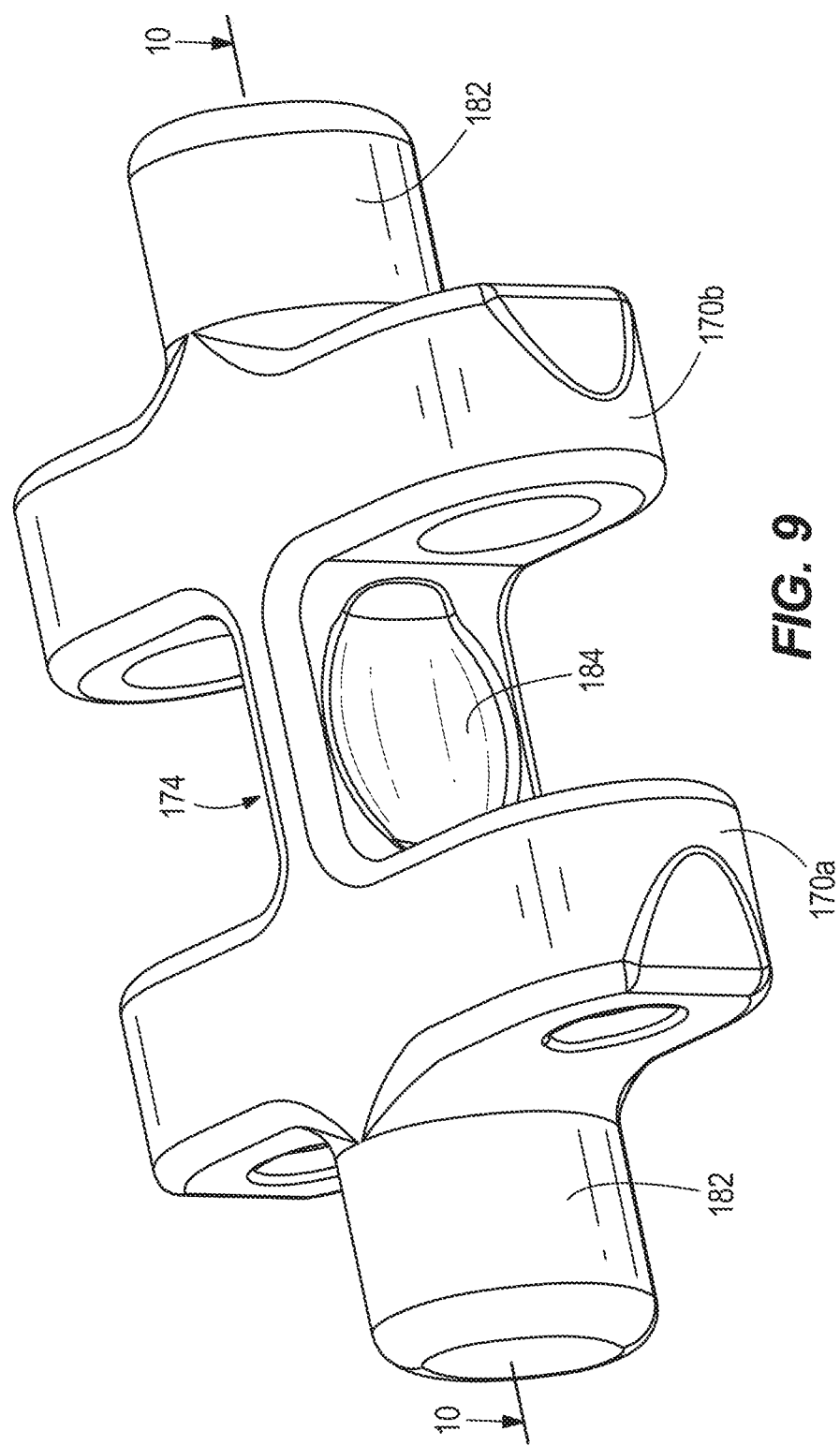
FIG. 9 is a perspective view of a connecting link according to another embodiment.

As shown in FIGS. 6-8, the bridge 174 of the connecting link 90 includes a concave surface 184 and an opening 186. The bridge 174 extends between the side portions 170 in a direction substantially perpendicular to the direction of travel 126 (FIG. 6). The concave surface 184 and opening 186 provide clearance to permit pivoting movement of the swivel link 94 (FIG. 8). The concave surface 184 and opening 186 permit the end of the swivel link 94 to be thicker, thereby increasing the strength and wear life of the swivel link 94. In addition, the opening 186 provides a path for material to pass through, thereby preventing accumulation of the material that may cause the connecting link 90 and swivel link 94 to bind and/or wear. In other embodiments, shown for example in FIG. 9, the bridge 174 may include only a concave surface 184 without an opening.

Referring again to FIG. 5, the swivel link 94 includes a first end 190, a second end 194, and a pair of openings 198 extending laterally from one side of the swivel link 94 to another opposite side of the swivel link 94. A swivel link longitudinal axis 200 extends between the first end 190 and the second end 194. Under nominal operating conditions, the swivel link longitudinal axis 200 is aligned with the direction of travel 126 of the chain 82. In the illustrated embodiment, the swivel link 94 is formed as a vertical open chain link in which the openings 198 are separated by a gusset or reinforcement member 202. The reinforcement member 202 extends between a first or upper wall 204 and a second or lower wall 208 of the swivel link 94. Each swivel link 94 further includes a pair of support members or bearings, such as spherical bearings 206. Each bearing 206 is positioned in a pocket 210 (FIG. 5) formed in an associated one of the openings 198 of the swivel link 94.

One of the openings 198 is aligned with parallel apertures 178 in the side portions 170 of the connecting link 90, while the other opening 198 is aligned with parallel apertures 114 in the side portions 106 of the flight link 86. A first connecting pin or first chain pin 214 is inserted through the apertures 178 of the connecting link side portions 170 and through one opening 198 of the swivel link 94, thereby coupling the swivel link 94 to the connecting link 90. Similarly, a second connecting pin or second chain pin 222 is inserted through the apertures 114 of the flight link side portions 106 and through the other opening 198 of the swivel link 94, thereby coupling the swivel link 94 to the flight link 86. Each of the chain pins 214, 222 is supported for pivoting movement relative to the swivel link 94 by one of the bearings 206 positioned in the connected swivel link 94.

In the illustrated embodiment, the first chain pin 214 is inserted through the connecting link side portions 170 in a first lateral direction, while the second chain pin 222 is inserted through the flight link side portions 106 in a second lateral direction opposite the first lateral direction. The chain pins 214, 222 are secured against movement relative to the connecting link 90 and the flight link 86 by retainers (described below). Also, in some embodiments, an outer side of one of the side portions 170 may include an aperture having a reduced diameter 224 (FIG. 8) such that each pin 214 can only be inserted from one side of the connecting link to the other. The apertures of the flight link may be structured in a similar manner.

Figure 10:
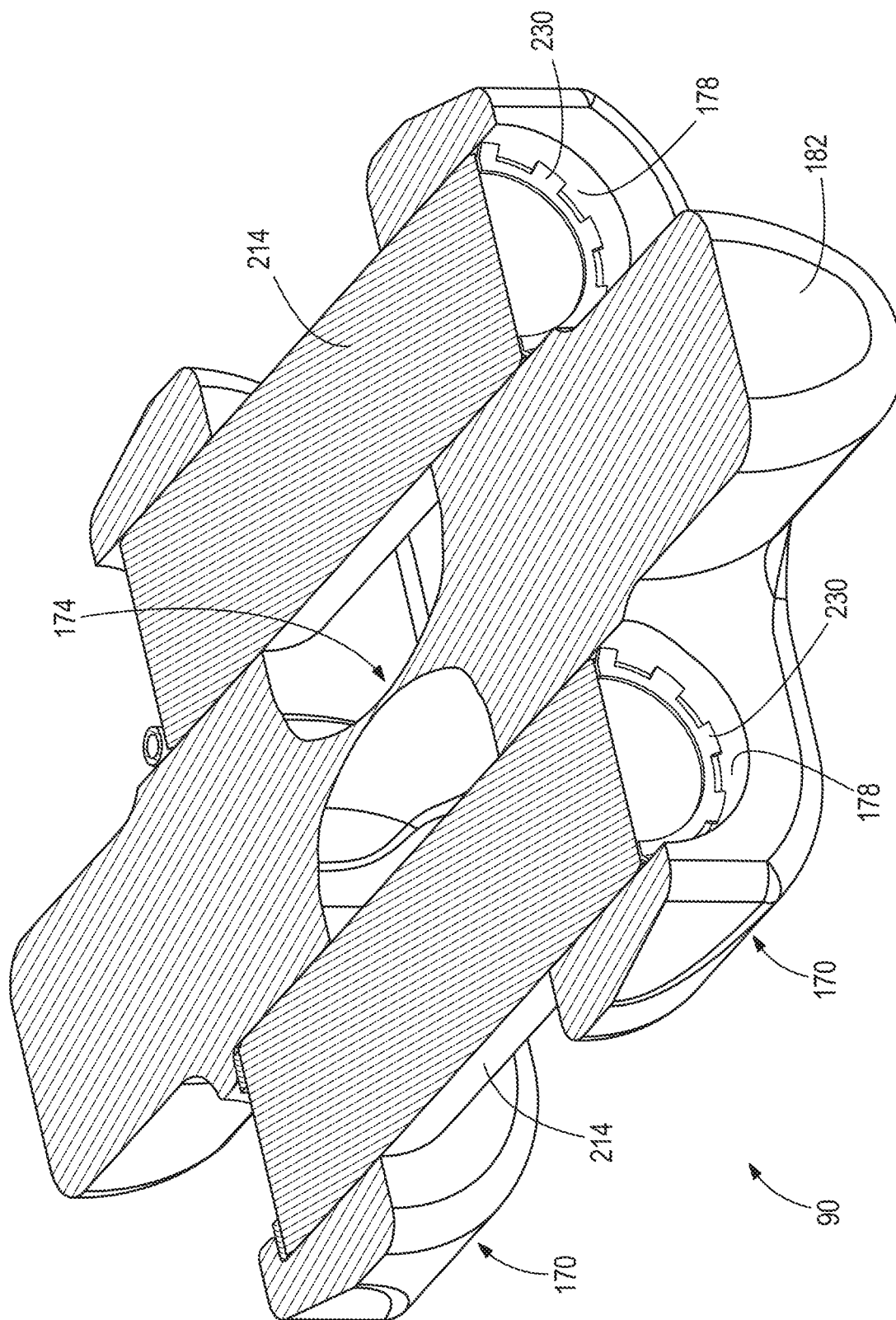
FIG. 10 is a perspective section view of a connecting link of FIG. 9 viewed along section 10-10 and including chain pins and retainers.
Figure 11:
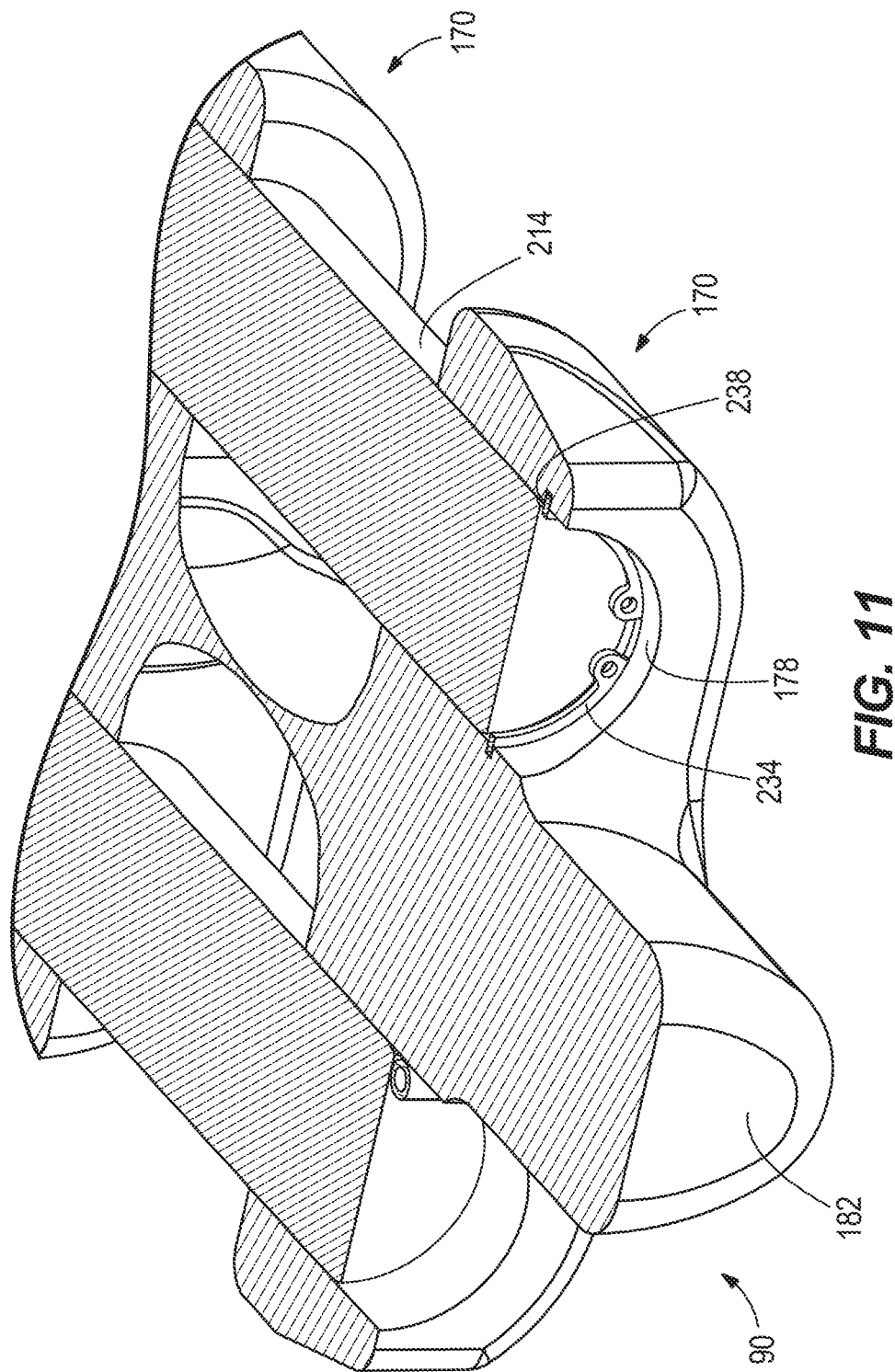
FIG. 11 is a perspective section view of a connecting link of FIG. 9 viewed along section 10-10 and including chain pins and retainers.
Figure 12:
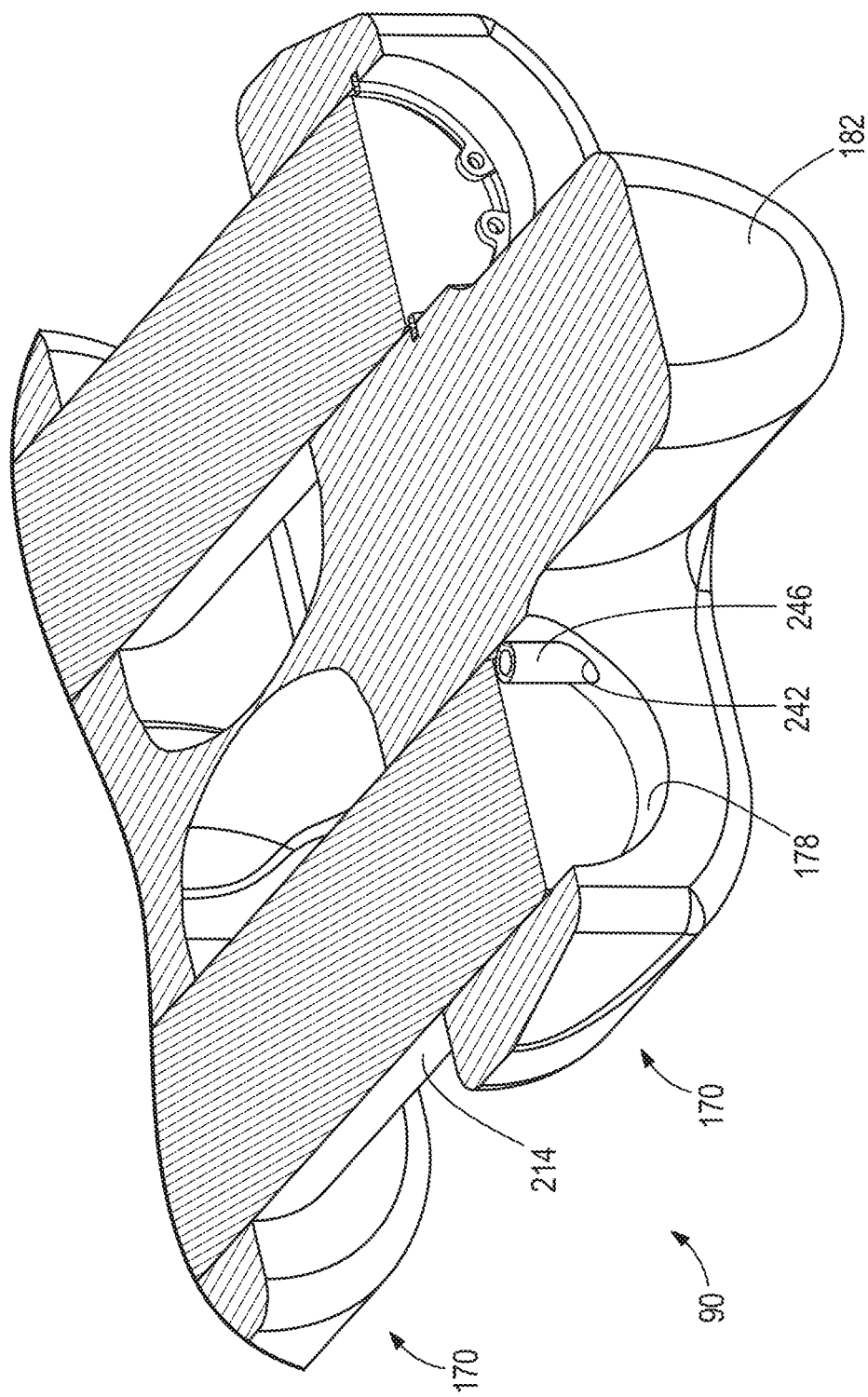
FIG. 12 is a perspective section view of a connecting link of FIG. 9 viewed along section 10-10 and including chain pins and retainers.

The chains pins 214, 222 are secured against movement relative to the connecting link 90 and flight link 86 by retainer mechanisms. As shown in FIG. 10, the retainer mechanism may include a self-locking retainer ring 230 secured within the apertures 178 proximate one side of the connecting link 90, abutting an end of the chain pin 214. Alternatively, or in addition to the self-locking retainer ring 230, as shown in FIG. 11 the retainer mechanism may include a clip-style retainer ring 234 received within a slot 238 extending around an inner perimeter of the aperture 178 adjacent one side of the connecting link 90 to abut an end of the chain pin 214. The clip-style ring 234 may be compressed to position the ring 234 within the slot 238, and then is biased outwardly to secure the ring 234 within the slot 238. Alternatively, or in addition to the above retaining mechanisms, as shown in FIG. 12 the retainer mechanism may include a hole 242 extending through the side portion 170 and through the aperture 178, and a pin 246 positioned within the hole 242 to abut an end of the chain pin 214.

Unlike conventional chains that incorporate external retaining mechanisms that are prone to failure and require additional machining, the retainer mechanisms are positioned internally (within the apertures 178 of the connecting link 90) to prevent movement of the chain pins 214 within the apertures 178. As a result, simpler, stronger chain pins may be used and the manufacture and machining of the chain components is simplified. Although the retainer mechanisms are illustrated above with respect to the connecting link 90 shown in FIG. 9, it is understood that similar mechanisms could be incorporated into the connecting link of FIGS. 7-9 as well. Also, while the retainer mechanisms are illustrated with respect to a connecting link 90 and chain pins 214, it is understood that similar mechanisms could be incorporated into the flight link 86 to retain the chain pins 222.

Figure 13:
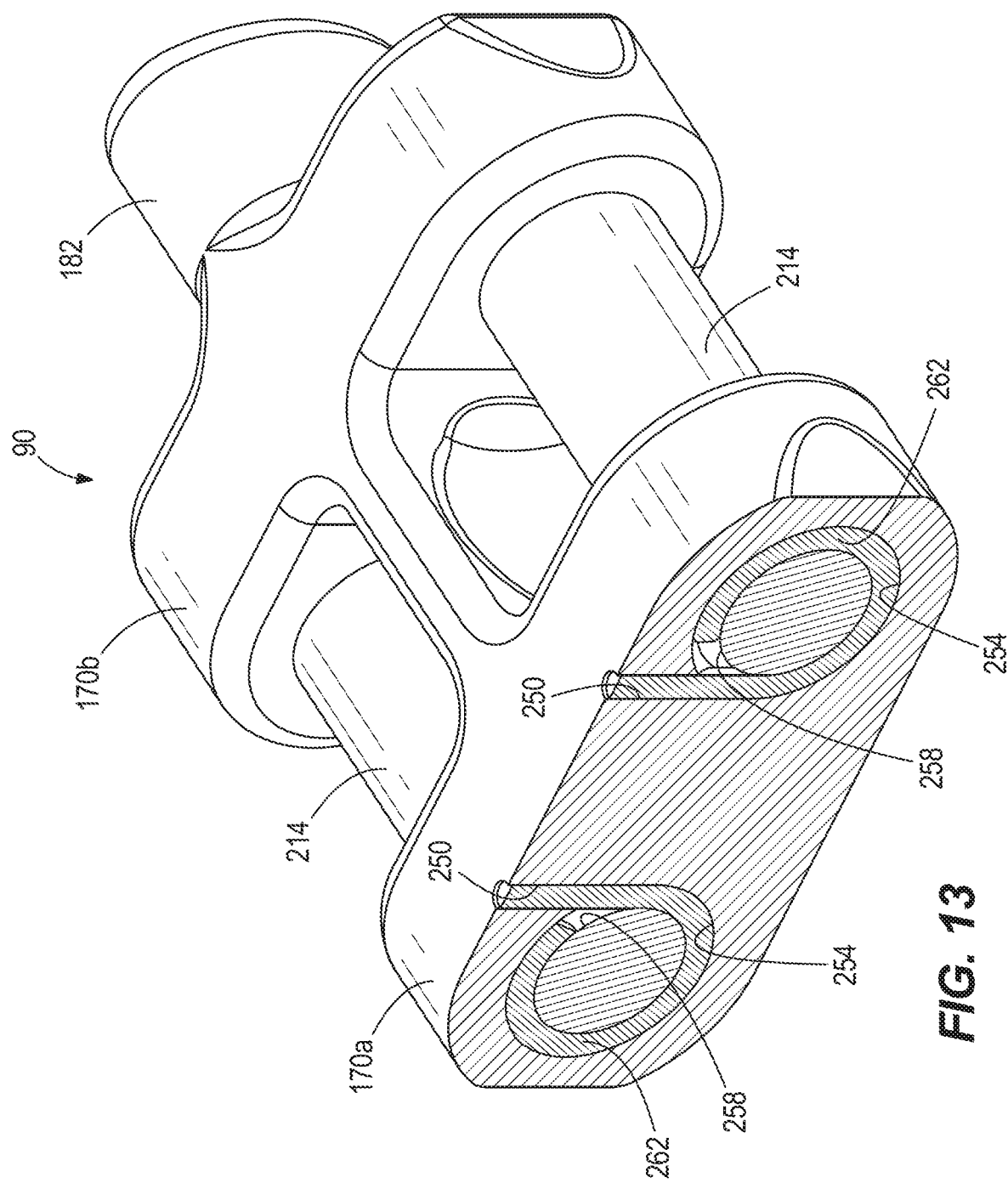
FIG. 13 is a section view of a connecting link of FIG. 4, viewed along section 13-13 and including retainers according to another embodiment.
Figure 14:
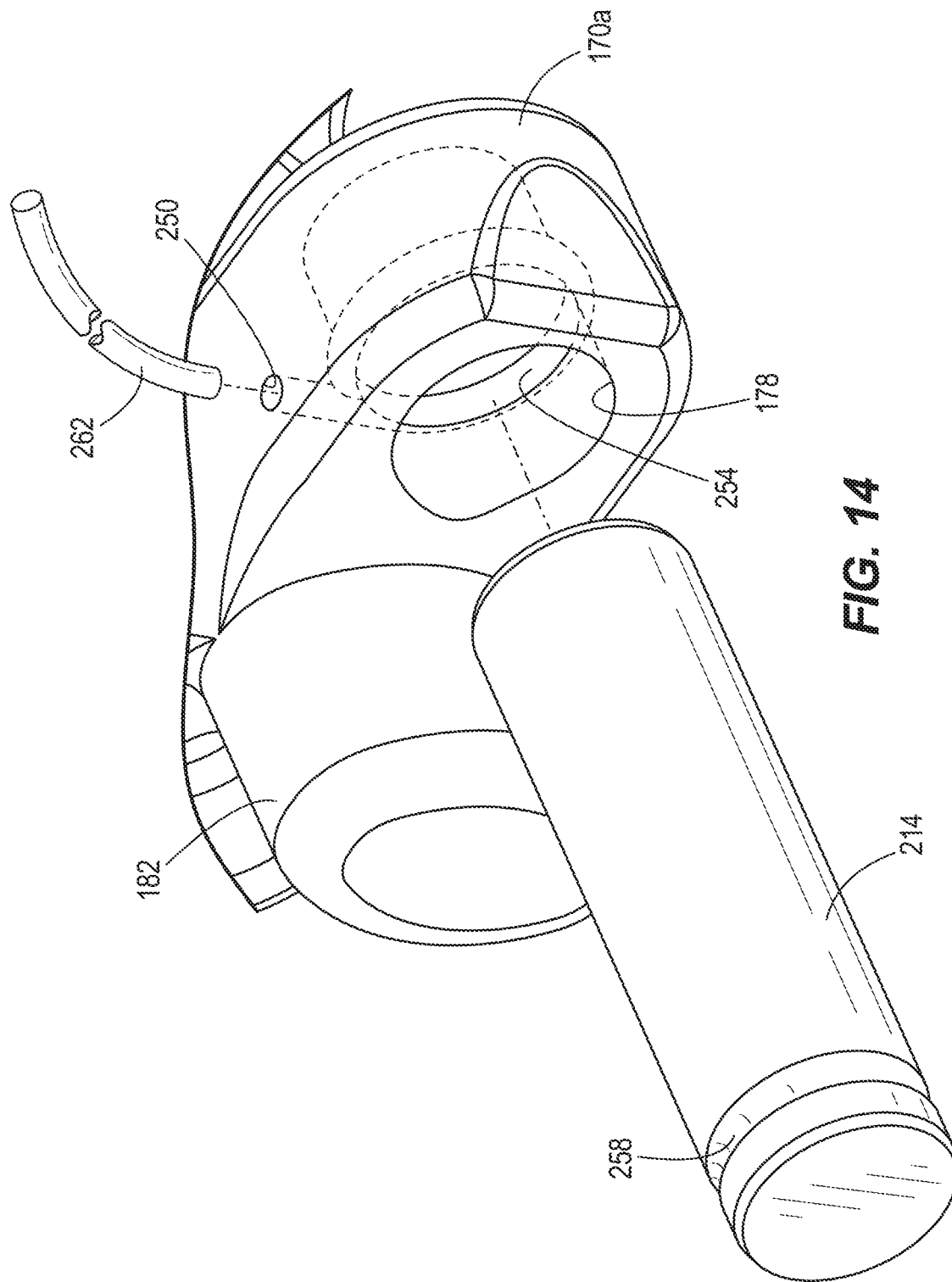
FIG. 14 is an exploded view of a portion of the connecting link and a retainer of FIG. 13.

FIGS. 13 and 14 illustrate a retainer according to another embodiment. An opening or hole 250 is formed in a side portion 170a the connecting link 90 and is in communication with or aligned with a slot 254 extending around a perimeter of the aperture 178 (FIG. 14) in which the chain pin 214 is positioned. In addition, a groove 258 is formed on an outer surface of the chain pin 214. When the pin 214 is positioned in the aperture 178 and the groove 258 is aligned with the slot 254, a wire 262 is inserted through the hole 250 of the side portion 170a. As the wire 262 is pressed into the hole 252, the wire 262 passes though the slot 254 and groove 258, wrapping around the chain pin 214. The wire 262 may be easily and quickly pressed into the hole 250, securing the chain pin 214 in place without requiring additional machining and with minimal material cost. The wire 262 also fills excess space between the chain pin 214 and the aperture 178 (e.g., due to stackup of tolerances). Although the retainer mechanism of FIGS. 13 and 14 is illustrated with respect to the connecting link 90 and chain pin 214, it is understood that similar mechanisms could be incorporated into the flight link 86 to retain the chain pin 222. It is understood that any combination of the retainer mechanisms described herein could be used incorporated into the flight links 86 and/or connecting links 90 of the chain.

Figure 15:
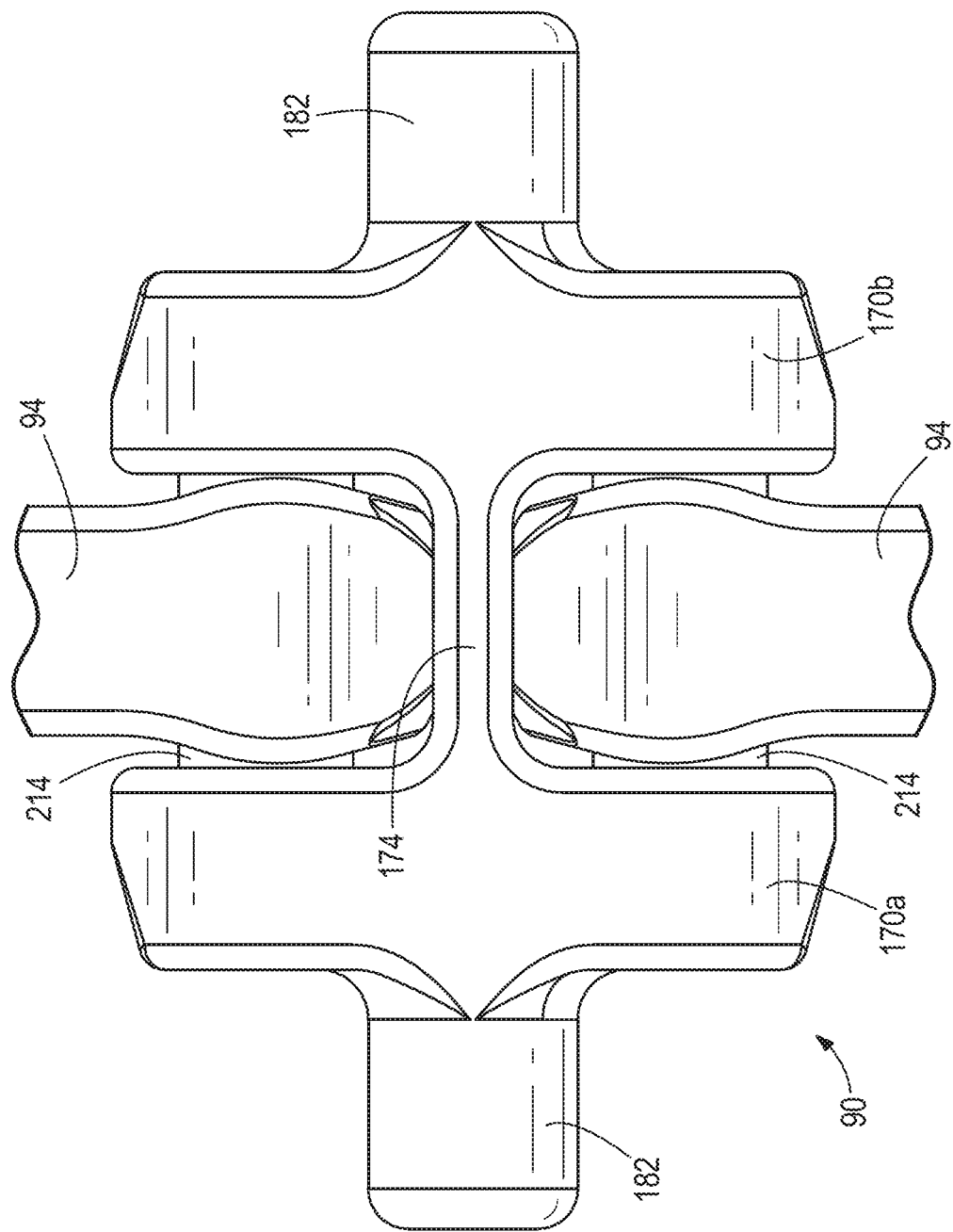
FIG. 15 is a plan view of the connecting link of FIG. 6 coupled to swivel links.

As shown in FIG. 15, the connecting link 90 is formed as a unitary member. Stated another way, the side portions 170, the bridge 174, and the drive pins 182 are formed integrally with one another. As a result, the connecting link 90 is less expensive to manufacture and easier to assemble than conventional chains. In addition, the connecting link 90 is stronger than conventional chains and reduces the risk of breakage or failure associated with multi-part chain assemblies. The integrated drive pins 182 increase the strength of the driving portion that engages the sprockets 66, and avoids engagement between the chain pins 214 and the sprockets 66 (FIG. 3).

As shown in FIG. 16, the drive pins 182 have an oblong profile at least along the surface where the drive pins 182 engage or contact the sprocket 66. As used herein, "oblong" refers to a non-circular shape having a perimeter that is at least partially curvilinear. Among other things, an oblong profile may include profiles having, for example, an elliptical or eccentric shape. Unlike the line contact interaction between conventional chains and sprockets, the non-circular profile permits "patch" contact between the drive pin 182 and the teeth 70 of the sprocket 66 to reduce the contact stresses and wear rates on the pins 182 and the sprockets 66. In addition, the profile permits the drive pins 182 to extend through the full height of the connecting link 90. Stated another way, a first edge or lower edge of each pin 182 is co-planar with the lower surface of the side portions 170 and the bridge 174. The drive portions 138 (FIG. 5) of the flight pins 122 have a similar profile. As shown in FIG. 17, the elongated pins 182 and drive portions 138 provide a chain profile in which the entire width of the chain contacts and scrapes the conveyor deck 58, unlike conventional chains that leave clearance portions in which material may accumulate. In some embodiments, a second edge or upper edge of each pin 182 is coplanar with an upper surface of the side portions 170 of the connecting link. Similarly, an upper edge of the drive portions can be coplanar with an upper surface of the side portions 106 of the flight link 86.

Figure 19:
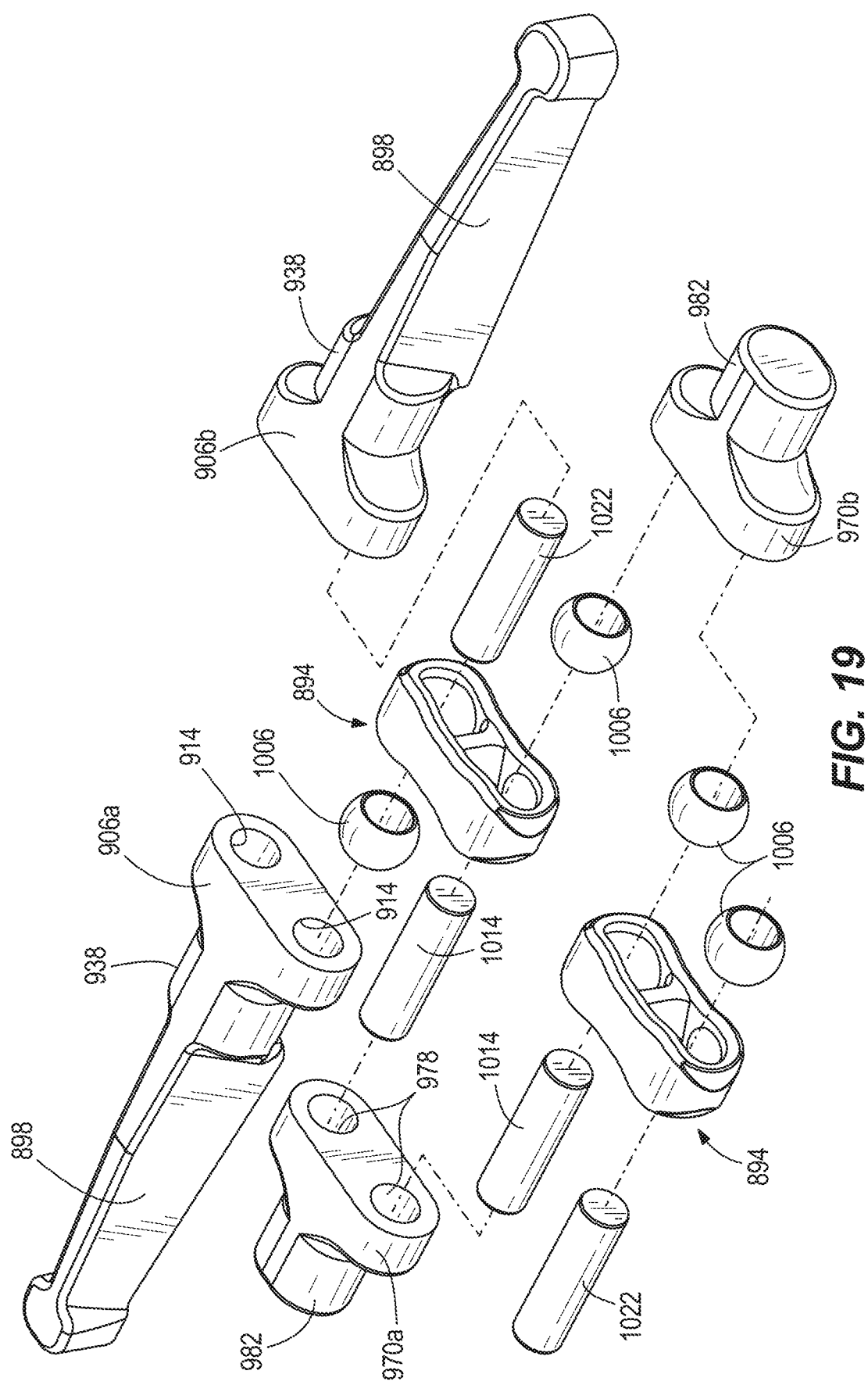
FIG. 19 is an exploded view of the chain conveyor unit of FIG. 18.

FIGS. 18 and 19 illustrate a chain 882 according to another embodiment. Features of the chain 882 are similar to features of the chain 82 and are identified with similar reference numbers, plus 800. At least some differences and/or at least some similarities between the chain 82 and 882 are described below. In addition, components or features described with respect to only one or some of the embodiments described herein are equally applicable to any other embodiments described herein.

The chain 882 includes a flight link 886 including a pair of side portions 906 that are separate from one another and not directly connected. Stated another way, the flight link 886 does not include a bridge between the side portions 906.

Rather, the side portions 906 are coupled to one another by the connecting pins 1022 (FIG. 19) extending between the side portion 906 and through a swivel link 894. Similarly, a connecting link 890 includes a pair of side portions 970 that are separate from one another and not directly connected. Stated another way, the connecting link 886 does not include a bridge between the side portions 970, which are formed as separate components 970a, 970b. Rather, the side portions 970 are coupled to one another by the connecting pins 1014 (FIG. 19) extending between the side portion 970 and through the swivel link 894.

In addition, a flight 898 is formed integrally with each side portion 906 of the flight link 886. In the illustrated embodiment, a drive portion 938 protrudes from each side portion 906, and the flight 898 extends laterally outwardly from an end of the drive portion 938. The drive portion 938 is positioned between the side portion 906 and the flight 898. It is understood that aspects of the chain 882 may be incorporated into other disclosed embodiments. For example, an integral flight may be incorporated into the flight link 86 described above with respect to FIGS. 4 and 5.

Although the conveyor is described above with respect to a continuous mining machine, it is understood that the conveyor may be incorporated into other types of machines including but not limited to roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A link for a chain conveyor, the link comprising:
a first portion including a first sprocket-engaging pin;
a second portion oriented parallel to and laterally spaced apart from the first portion, the second portion including a second sprocket-engaging pin, the first sprocket-engaging pin and the second sprocket-engaging pin aligned with one another along an axis that is transverse to a direction of travel of the link, the first sprocket-engaging pin and the second sprocket-engaging pin protruding in a direction laterally away from a centerline axis; and
an intermediate portion extending between the first portion and the second portion and integrally formed with the first portion and the second portion,
wherein a pair of first apertures are oriented at least partially through the first portion and a pair of second apertures are oriented at least partially through the second portion, wherein the second apertures are aligned with the first apertures, wherein the first sprocket-engaging pin is positioned between the pair of first apertures, and wherein the second sprocket-engaging pin is positioned between the pair of second apertures.

2. The link of claim 1, wherein the intermediate portion includes an opening extending parallel to the centerline axis.

3. The link of claim 1, wherein the intermediate portion includes an opening extending in a direction parallel to a direction of travel of the link during operation.

4. The link of claim 1, further comprising a first flight positioned adjacent an end of the first sprocket-engaging pin and a second flight positioned adjacent an end of the second sprocket-engaging pin.

5. The link of claim 1, wherein the first sprocket-engaging pin has an oblong cross-section, wherein the second sprocket-engaging pin has an oblong cross-section.

6. The link of claim 1, wherein the intermediate portion is laterally aligned with the first sprocket-engaging pin and the second sprocket-engaging pin.

7. The link of claim 1, wherein a connecting pin extends through one of the first apertures of the first portion and into one of the second apertures of the second portion.

8. The link of claim 7, wherein a portion of the one of the second apertures includes a reduced diameter to engage a portion of the connecting pin and inhibit the connecting pin from passing through the one of the second apertures.

9. The link of claim 7, further comprising a retainer for securing the connecting pin against movement relative to the first portion, the retainer positioned substantially within the first portion.

10. The link of claim 9, wherein the connecting pin includes a groove extending along a least a portion of a perimeter of an outer surface of the connecting pin, the groove aligned with an opening formed in the first portion, wherein the retainer includes an elongated member positioned within the opening and extending along at least a portion of the groove to secure the connecting pin within the first aperture.

11. The link of claim 10, wherein the elongated member extends in an arcuate manner along at least a portion of the groove.

12. A conveyor chain comprising:
a first link portion including a first inner surface defining a first aperture, the first link portion including a first slot formed in the first inner surface;
a second link portion;
a connecting pin coupled between the first and second link portions, the connecting pin including an outer surface and a groove formed in the outer surface, the connecting pin received within the first aperture of the first link portion such that the groove aligns with the first slot; and
a retainer positioned between the groove and the first slot to secure the connecting pin against movement relative to the first link portion.

13. The conveyor chain of claim 12, wherein the second link portion includes a second inner surface defining a second aperture, wherein the second link portion includes a second slot formed in the second inner surface, wherein the groove of the connecting pin is a first groove and the connecting pin includes a second groove formed in the outer surface, and wherein the retainer is a first retainer and the conveyor chain further comprises a second retainer positioned between the second groove and the second slot to secure the connecting pin against movement relative to the second link portion.

14. The conveyor chain of claim 13, wherein the first link portion includes a first opening in communication with the first slot, wherein the first retainer is inserted into the first opening to be positioned between the first groove and the first slot, wherein the second link includes a second opening in communication with the second slot, and wherein the second retainer is inserted into the second opening to be positioned between the second groove and the second slot.

15. The conveyor chain of claim 14, wherein the first retainer is a first wire, and wherein the second retainer is a second wire.

16. The conveyor chain of claim 12, wherein the first link portion and the second link portion are integrally formed with one another by a bridge portion extending between the first link portion and the second link portion.

17. The conveyor chain of claim 12, wherein the first link portion and the second link portion are separate from one another.

18. The conveyor chain of claim 17, wherein the first link portion includes a first flight formed integral with the first link portion, and wherein the second link portion includes a second flight formed integral with the second link portion.

19. The conveyor chain of claim 12, wherein the retainer engages the groove of the connecting pin and the first slot of the first link portion.

20. A conveyor chain comprising:
a first link portion including a first outer surface and a first opening formed in the first outer surface, the first link portion including a first inner surface defining a first aperture, the first opening in communication with the first aperture;
a second link portion;
a connecting pin coupled between the first and second link portions, the connecting pin received within the first aperture of the first link portion; and
a retainer insertable into the first opening to be positioned between the first link portion and the connecting pin to secure the connecting pin against movement relative to the first link portion.

21. The conveyor chain of claim 20, wherein the second link portion includes a second outer surface and a second opening formed in the second outer surface, wherein the second link portion includes a second inner surface defining a second aperture, wherein the second opening is in communication with the second aperture, and wherein the retainer is a first retainer and the conveyor chain further comprises a second retainer insertable into the second opening to be positioned between the second link portion and the connecting pin to secure the connecting pin against movement relative to the second link portion.

22. The conveyor chain of claim 21, wherein the first retainer is a first wire, and wherein the second retainer is a second wire.

23. The conveyor chain of claim 20, wherein the first link portion and the second link portion are integrally formed with one another by a bridge portion extending between the first link portion and the second link portion.

24. The conveyor chain of claim 20, wherein the first link portion and the second link portion are separate from one another.

25. The conveyor chain of claim 24, wherein the first link portion includes a first flight formed integral with the first link portion, and wherein the second link portion includes a second flight formed integral with the second link portion.

26. The conveyor chain of claim 20, wherein the retainer engages a groove of the connecting pin and a slot formed in the first inner surface of the first link portion.

* * * * *